(12) United States Patent
Farrugia et al.

(10) Patent No.: US 8,184,804 B2
(45) Date of Patent: May 22, 2012

(54) HASH FUNCTION USING A PILING-UP PROCESS

(75) Inventors: Augustin J. Farrugia, Cupertino, CA (US); Mathieu Ciet, Paris (FR); Benoit Chevallier-Mames, Paris (FR)

(73) Assignee: Apple Inc., Cupertino, CA (US)

( * ) Notice: Subject to any disclaimer, the term of this patent is extended or adjusted under 35 U.S.C. 154(b) by 605 days.

(21) Appl. No.: 12/433,732

(22) Filed: Apr. 30, 2009

(65) Prior Publication Data

US 2010/0281256 A1    Nov. 4, 2010

(51) Int. Cl.
*H04K 1/00* (2006.01)
*H04L 9/00* (2006.01)
*H04L 9/28* (2006.01)

(52) U.S. Cl. ........................................... 380/28

(58) Field of Classification Search .................. 380/28
See application file for complete search history.

(56) References Cited

U.S. PATENT DOCUMENTS

2008/0025593 A1 *   1/2008   Ajioka ..................... 382/141

* cited by examiner

*Primary Examiner* — Edan Orgad
*Assistant Examiner* — Jahangir Kabir
(74) *Attorney, Agent, or Firm* — Morrison & Foerster LLP

(57) ABSTRACT

In the computer data security field, a cryptographic hash function process embodied in a computer system and which is typically keyless, but is highly secure. The process is based on the type of randomness exhibited by well known tetromino stacking games. Computation of the hash value (digest) is the result of executing such a "piling on" (tetromino stacking game) algorithm using the message as an input (a seed) to a pseudo random number generator which generates the game pieces (shapes) from the resulting random numbers, then executing the game algorithm.

23 Claims, 3 Drawing Sheets

| NAME | TYPE | COMMENTS |
|---|---|---|
| X | integer | number of columns of the board |
| Y | integer | number of rows of the board |
| memoryBoard | integer table | X*Y table of cells (bytes); the memory board |
| playingBoard | integer table | X*Y table of cells (bytes); the player board |
| acc | data (e.g., large integer) | used as an equivalent of some boards |
| tmpAcc | data (e.g., large integer) | used as an equivalent of some boards |
| tmpVal | integer | PRNG number (seed, outputs) |
| tmpPiece | piece | a piece (form, color, position) |
| emptyBoard | board | an empty board (all cells are between 0 and 31) |

Fig. 1

HASH FUNCTION USING A PILING-UP PROCESS

FIELD OF THE INVENTION

This invention relates to computers, computer data security, and hash functions (hashing).

BACKGROUND

Hash functions are well known in the field of data security. The principal is to take data (a digital message, digital signature, etc.) and use it as an entry to a hash function resulting in an output called a "digest" of predetermined length which is intended to uniquely identify ("fingerprint") the message. A secure (cryptographic) hash is such that any alteration in the message results in a different digest, even though the digest is much shorter than the message. Such hash functions are "collision-resistant" and "one-way."

Cryptography and data security deal with digital signatures, encryption, document authentication, and hashing. In all of these fields, there is a set of basic tools/functions which are widely used, for instance hash functions. Several properties are required for the use of hash functions in cryptographic applications: preimage resistance, second preimage resistance and collision resistance.

In the recent years, much energy has been expended finding new hash functions, since collisions (weaknesses or successful attacks) have been found in the widely used SHA-1 standard hash.

SUMMARY

Disclosed here is a new type of cryptographic (secure) hash function or process. The goal is a highly modular hash function that is also computationally efficient. The present hash function can conventionally be used for document integrity for exchanges and signatures. It can be also used as a derivation function or as a HMAC (hash message access code) by adding a key conventionally (as in for instance the well known HMAC-SHA1) and the term "hash" as used herein is intended to encompass all these uses, both keyed and non-keyed.

A hash function is a deterministic procedure that accepts an arbitrary input value, and returns a hash value. The input value is called the message, and the resulting output hash value is called the digest. The message is authenticated by comparing the computed digest to an expected digest associated with the message.

The present hash process is based on the concept and logic of tetromino stacking ("piling up") video games. Such games as well known display a "board" of cells, which begins completely empty. Then a game piece falls down, until it is blocked by full cells. Once a piece is blocked, a new piece fails down. Each time a line of the board is full, it is erased/discarded/destroyed. The game finishes when a new piece is blocked directly at its creation, without being able to fall. In the present hash function, there is no introduction of randomness from the user in such a process since the way the pieces are moved is uniquely determined by the input in one embodiment. This means the hash function disclosed here is completely deterministic.

The present approach is based on the observation that when one finishes a tetromino stacking video game, the game board (video screen) is very chaotic, that is the board cells are full or empty, and the color of the full cells also varies. The present goal is to use the principle of such games to compute a hash function since such a chaotic characteristic provides a secure hash function. In this sense secure means strongly one way, meaning that given a message it is easy to compute the digest, but it is very difficult to find a message that returns a given digest.

To provide a hash function (or a derivation function) with this stacking game principle, one uses the message (the entry of the hash function) as a game "piece" generator (where the resulting piece description includes e.g. the piece "format" and "color"). The message is then used as a seed input to a conventional computer code or logic-based pseudo random number generator (PRNG) or other derivation function to generate a set of pieces each with a defined color and format and the place (location) on the board where the piece is going to fall. After a certain number of piece generation and falling iterations, the hash value (digest) is defined to be the values of (or part of) the memory board at the end of the process.

In the present hash function process (or a derivation function) using this principle, the goal is to use the message (the entry to the hash function) as a notional piece generator (the piece attributes including the piece format and its color and location). The message is then considered as a seed to generate a set of notional pieces each with defined notional format and color and the notional board location where the piece is going to fall.

The notional pieces are generated and they notionally fall at a given position until they are blocked. As in the actual game, full lines are erased, until the end of the notional game occurs. A difference here compared to the actual games is that the pieces here each include as an attribute (at their generation time) the position where they are going to fall (in other words, they do not move horizontally). Further there is no user (player) involvement in the "game" algorithm here.

When the notional game ends, which means that the notional game board is full, the game board in one embodiment may be logically XORed (exclusive or function) with a "memory board", serving as an accumulator. (This XOR is merely illustrative of a suitable logical function.) This memory board is initially set to an initial value, e.g. 0, at the beginning of the hashing process. Then the playing board is emptied, and the notional generation of new pieces, new colors and new piece positions continues.

Each final notional board is, e.g., logically XORed (exclusive or operation) to the memory board, thus the memory board is updated several times (according to a security parameter) during the hashing process.

A well known example of such tetromino stacking games is Tetris® which is a video/computer game executed on a computer processor by computer code with the game board displayed on an associated video screen. The game player plays by moving the game pieces horizontally or rotating them. The game pieces have characteristic shapes, each shape being displayed as a set of contiguous squares (cells).

In accordance with the present invention however, there is no player and no horizontal or rotational movement of the pieces. There is also no game board displayed. Instead only the core game functionality (logic) in the form of computer software is used to generate a digest (a state of the "game" logic as explained above) from the input message.

Since such games are well known and exist in many variants, programming details of the tetromino stacking algorithm (which is the core of such games) are not given here as being well known in the field. Other examples of such games are also well known. Writing such code is well known to be relatively simple and is a standard student programming project. Many variations of such games are known and their principles may be used in accordance with the invention, given however that here no person is playing a game but there is execution of the core tetromino stacking algorithm (logic) of such a game to generate the hash digest.

Note that terms such as "piece," "form," "format," "color," "position," "board," "stacking," "tetromino" and "orientation" and "game" as used here in connection with the present invention do not refer to any physical object or any actual depiction of same even on a computer or game display, but instead to values, identifiers, or variables used in computer code or logic to compute a hash function or equivalent, and are used only for convenience of understanding herein as referring conceptually to analogous aspects of the above described stacking games.

BRIEF DESCRIPTION OF THE FIGURES

FIG. 1 shows a set of variables and parameters.

DETAILED DESCRIPTION

Figure 2:
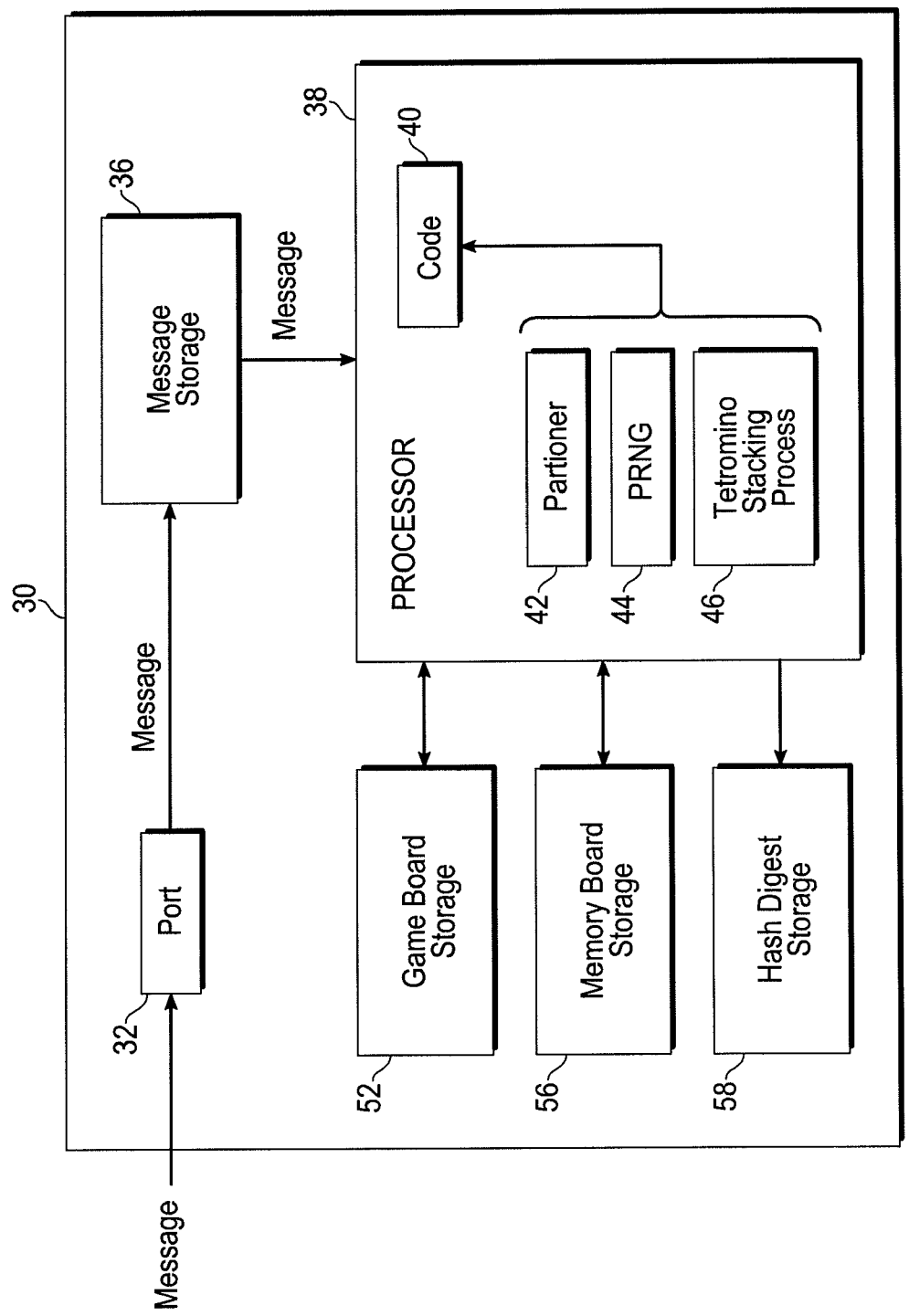
FIG. 2 shows relevant portions of a computing device for carrying out the present method.

In detail, consider a notional game "board" of X columns and Y rows. ("Notional" here refers to having no physical existence, and indicates correspondence to a stacking game.) That is, a memory "board" is denoted "memoryBoard" and is a matrix of X columns and Y rows, and a playing board "playingBoard" matrix of X columns and Y rows. Note that one could use different sizes for memoryBoard and playingBoard—respectively X,Y and X',Y'—in this case a mapping function from $X*Y*(0,1)^{t1}$ and $X'*Y'*(0,1)^{t2}$ matrices would be necessary, where t1 and t2 denote the number of bits in words of the matrices and "^" designates the power operation). In other words, one maps the $X*Y*2^{t1}$ elements (bits) of the first matrix to the $X'*Y'*2^{t2}$ bits of the second matrix. For this example, cells of the matrices are data bytes, but the cells can contain a value of any length. Cells numbered between 0 and 31 correspond to empty cells, and cells with values between 32 and 255 are "colored" (full) cells for a 256 cell matrix (with X=Y=16).

Then, with a function initiated with the message to hash, "pieces" are generated: each piece corresponds to a "color" (i.e., a value between 32 and 255), a "form" or format (in the various classical tetromino stacking game piece forms, or in some more evolved forms), and a column of the playing "board" where to launch the piece (this is a value between 0 and X−1). Then, using the classical stacking game principle of lines destruction, the generated pieces fall until the "game" is finished. Then, the "board" at the end is logically combined, e.g. XORed, with the memory "board", and the process is restarted a certain number of times.

When hashing several blocks of a message, one concatenates the number of the current block to the current block, and this padded data is used as the seed for a conventional PRNG (pseudo random number generator) which from the seed generates the attributes of a "piece." Because of this padding, it is not possible to invert message blocks and get the same hash result, hence enhancing security.

After a certain number of iterations (which number relates to a given security level) the "game" ends and the hash value (digest) is defined to be current the value of (or part of) the memory board state.

Expressed for ease of understanding in computer software pseudo-code (which is conventionally structurally similar to actual code but somewhat less detailed), the present hash function process is as follows:

```
Input: message m = {m_0 ... m_{ℓ− 1}}
Output: H(m) the hash of the message
   acc = 0;
   tmpVal = 0;
   memoryBoard = dataToBoard(acc);
   for( i = 0; i < ℓ − 1; i = i + 1)
      tmpVal = m_i || i;
      playingBoard = emptyBoard;
      for( j = 0 ; j < secuParam; )
         tmpVal = dataGenerator(tmpVal);
         tmpPiece = dataToPiece(tmpVal);
         playingBoard = updateBoard(playingBoard, tmpPiece);
         if(playingBoard == FULL)
            memoryBoard = XORBoard(playingBoard, memoryBoard);
            j = j + 1;
            playingBoard = emptyBoard;
         endif;
      endfor;
   endfor;
   acc = boardToData(memoryBoard);
   return acc;
A variant of this pseudo code is:
Input: message m = {m_0 ... m_{ℓ−1}}
Output: H(m) the hash of the message m
   acc = 0;
   tmpVal = 0;
   memoryBoard = dataToBoard(acc);
   for( i = 0; i < ℓ − 1; i = i + 1)
      tmpVal = m_i || i;
      playingBoard = emptyBoard;
      for( j = 0 ; j < secuParam; )
         tmpVal = dataGenerator(tmpVal);
         tmpPiece = dataToPiece(tmpVal);
         playingBoard = updateBoard(playingBoard, tmpPiece);
         if(playingBoard == FULL)
            tmpAcc = boardToData(playingBoard);
            acc = updateAcc(acc, tmpAcc);
            j = j + 1;
            playingBoard = emptyBoard;
         endif;
      endfor;
   endfor;
   return acc;
```

FIG. 1 shows variables and parameters for the above pseudo code with their type and explanatory comments. Functions in the pseudo code are as follows:

dataToBoard does a univocal mapping between data and a board value. Value zero is mapped into an empty board.

dataGenerator is a PRNG type (or similar derivation) function, which takes a seed and returns a pseudo-random number for each calculation.

dataToPiece is a function producing the description of one piece from a given input value. A piece description here includes the piece attributes such as format ("shape"), the piece "color", and the piece "position" (column). The piece description also includes the piece "orientation."

updateBoard is a function which takes a piece and a board, and constructs the new board with the tetromino stacking algorithm.

XORBoard is an operation logically merging two boards. These boards can be of different types.

boardToData is the inverse of the function dataToBoard.

x||y is the concatenation of values x and y.

updateAcc is a function which takes two binary data items and logically combines (e.g., XORs) them.

In these two variants, one may replace the code line tmpVal=m_i||i; by the line tmpVal=dataGenerator(m_i||i); which makes the hash function more secure by applying the pseudo random number twice.

FIG. 2 shows in a block diagram relevant portions of a computing device (system) 30 in accordance with the invention. This is, e.g., a computer, mobile telephone, Smart Phone, personal digital assistant or similar device, or part of such a device and includes conventional hardware components executing in one embodiment software (computer code) as represented by the above pseudo-code examples. This code may be, e.g., in the C or C++ computer language or its functionality may be expressed in the form of firmware or hardware logic; writing such code or designing such logic would be routine in light of the above pseudo code. Of course, the above pseudo code examples are not limiting.

The computer code is conventionally stored in code memory (computer readable storage medium) 40 (as object code or source code) associated with processor 38 for execution by processor 38. The incoming message is received at port 32 and stored in computer readable storage medium (memory) 36 where it is coupled to processor 38. Processor 38 typically partitions the message into suitable sized blocks at partitioning module 42. Other software (code) modules in processor 38 are the PRNG 44 which is conventional and the tetromino stacking algorithm module 46 which carries out the remainder of the code functionality set forth above.

Also coupled to processor 38 are the game board computer readable storage medium (memory) 52 and the memory board computer readable storage medium (memory) 56, as well as a third storage 58 for the resulting hash digest. Storage locations 36, 52, 56, 58 may be in one or several conventional physical memory devices (such as semiconductor RAM or its variants or a hard disk drive).

Electric signals conventionally are carried between the various elements of FIG. 2. Not shown in FIG. 2 is the subsequent conventional use of the resulting hash digest, which is compared by processor 30 to a second expected hash value associated with the message. Only if the two hash values match is the message (a digital document, digital signature or similar information) authenticated.

Figure 3:
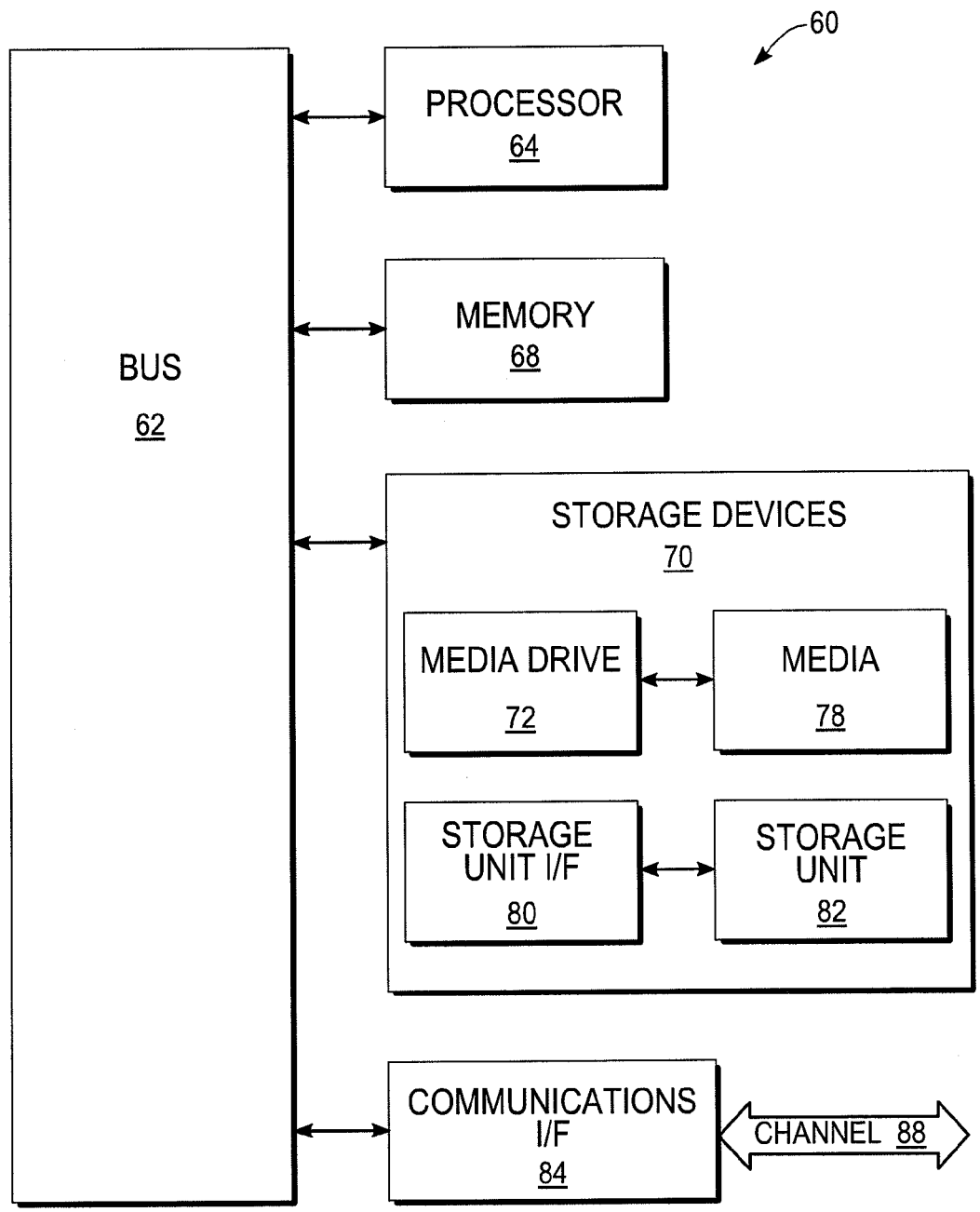
FIG. 3 shows additional detail of the FIG. 2 computing device.

FIG. 3 shows further detail of the computing device in one embodiment. FIG. 3 illustrates a typical and conventional computing system 60 that may be employed to implement processing functionality in embodiments of the invention and shows additional detail of the FIG. 2 system. Computing systems of this type may be used in a computer server or user (client) computer or other computing device, for example. Those skilled in the relevant art will also recognize how to implement embodiments of the invention using other computer systems or architectures. Computing system 60 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 50 can include one or more processors, such as a processor 64 (equivalent to processor 38 in FIG. 2). Processor 64 can be implemented using a general or special purpose processing engine such as, for example, a microprocessor, microcontroller or other control logic. In this example, processor 64 is connected to a bus 62 or other communications medium.

Computing system 60 can also include a main memory 58 (equivalent to memories 52, 56, 58), such as random access memory (RAM) or other dynamic memory, for storing information and instructions to be executed by processor 64. Main memory 68 also may be used for storing temporary variables or other intermediate information during execution of instructions to be executed by processor 64. Computing system 60 may likewise include a read only memory (ROM) or other static storage device coupled to bus 62 for storing static information and instructions for processor 64.

Computing system 60 may also include information storage system 70, which may include, for example, a media drive 62 and a removable storage interface 80. The media drive 72 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 78 may include, for example, a hard disk, floppy disk, magnetic tape, optical disk, CD or DVD, or other fixed or removable medium that is read by and written to by media drive 72. As these examples illustrate, the storage media 78 may include a computer-readable storage medium having stored therein particular computer software or data.

In alternative embodiments, information storage system 70 may include other similar components for allowing computer programs or other instructions or data to be loaded into computing system 60. Such components may include, for example, a removable storage unit 82 and an interface 80, such as a program cartridge and cartridge interface, a removable memory (for example, a flash memory or other removable memory module) and memory slot, and other removable storage units 82 and interfaces 80 that allow software and data to be transferred from the removable storage unit 78 to computing system 60.

Computing system 60 can also include a communications interface 84 (equivalent to port 32 in FIG. 2). Communications interface 84 can be used to allow software and data to be transferred between computing system 60 and external devices. Examples of communications interface 84 can include a modem, a network interface (such as an Ethernet or other network interface card (NIC)), a communications port (such as for example, a USB port), a PCMCIA slot and card, etc. Software and data transferred via communications interface 84 are in the form of signals which can be electronic, electromagnetic, optical or other signals capable of being received by communications interface 84. These signals are provided to communications interface 84 via a channel 88. This channel 88 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 68, storage device 78, or storage unit 82. These and other forms of computer-readable media may store one or more instructions for use by processor 64, to cause the processor to perform specified operations. Such instructions, generally referred to as "computer program code" (which may be grouped in the form of computer programs or other groupings), when executed, enable the computing system 60 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 60 using, for example, removable storage drive 74, drive 72 or communications interface 84. The control logic (in this example, software instructions or computer program code), when executed by the processor 64, causes the processor 64 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A hashing method performed by a computing apparatus and comprising the acts of:
   (a) receiving a message at an input port;
   (b) storing the received message at a first computer readable storage medium coupled to the input port;
   (c) generating a pseudo random or derived value from a portion of the stored message by a computer processor coupled to the first storage medium;
   (d) the processor determining a description from the pseudo random or derived value, the description including a form parameter, a color parameter, and a position parameter;
   (e) storing a set of values representing a matrix in a second computer readable storage medium coupled to the processor, the matrix representing a board in a tetromino stacking algorithm, and the form, color and position parameters representing attributes of a piece in the stacking algorithm;
   (f) updating the matrix by applying the stacking algorithm to the matrix and the description;
   (g) repeating acts (c), (d), (e), and (f) until the stacking algorithm reaches a predetermined state;
   (h) using the updated matrix resulting from act (g) to provide a hash value of the message; and
   (i) the processor storing the hash value in a third computer readable storage medium.

2. The method of claim 1, wherein act (h) includes applying a logical function to the updated matrix.

3. The method of claim 1, wherein the description further includes an orientation parameter of the piece.

4. The method of claim 1, wherein act (c) further includes concatenating a block number of the portion of the message with the portion of the message to generate the random or pseudo random value.

5. The method of claim 1, wherein the stacking algorithm is of the type used in tetromino stacking games.

6. The method of claim 1, further comprising the acts of:
   receiving a hash value associated with the message at the processor;
   comparing the received hash value to the stored hash value of act (g); and
   authenticating the message if the comparison indicates a match.

7. The method of claim 1, wherein the message is one of a digital signature or document, a digital message, a secret key or an identifier.

8. The method of claim 1, further comprising the acts of:
   storing a set of values representing a second matrix; and
   wherein act (h) includes applying a logical function to the second matrix and the updated matrix.

9. The method of claim 1, wherein each value in the matrix is one bit of data, one byte of data, one 16-bit word, one 32-bit word, or one 128-bit word.

10. The method of claim 1, wherein the predetermined state of the stacking algorithm is completion of the stacking algorithm.

11. The method of claim 1, wherein the form parameter has at least one value, and the color parameter has at least one value.

12. A computer readable non-transitory medium storing computer code instructions for executing the method of claim 1 on the computing apparatus.

13. An apparatus for computing a hash, comprising:
   (a) an input port for receiving a message;
   (b) a first computer readable storage medium coupled to the input port for storing the received message; and
   (c) a computer processor coupled to the first storage medium and which generates a pseudo random or derived value from a portion of the stored message;
   (d) wherein the processor determines a description from the pseudo random or derived value, the description including a form parameter, a color parameter, and a position parameter;
   (e) wherein the processor stores a set of values representing a matrix in a second computer readable storage medium coupled to the processor, the matrix representing a board in a tetromino stacking algorithm, and the form, color and position parameters representing attributes of a piece in the stacking algorithm;
   (f) wherein the processor updates the matrix by applying the stacking algorithm to the matrix and the description;
   (g) wherein the processor repeats (c), (d), (e), and (f) until the stacking algorithm reaches a predetermined state;
   (h) wherein the processor uses the updated matrix resulting from (g) to provide a hash value of the message; and
   (i) wherein the processor stores the hash value in a third computer readable storage medium coupled to the processor.

14. The apparatus of claim 13, wherein (h) includes applying a logical function to the updated matrix.

15. The apparatus of claim 13, wherein the description further includes an orientation parameter of the piece.

16. The apparatus of claim 13, wherein (c) further includes concatenating a block number of the portion of the message with the portion of the message to generate the random or pseudo random value.

17. The apparatus of claim 13, wherein the stacking algorithm is of the type used in tetromino stacking games.

18. The apparatus of claim 13, further comprising:
   receiving at the processor from the port a hash value associated with the message;
   comparing at the processor the received hash value to the stored hash value of (g); and
   authenticating the message if the comparison indicates a match.

19. The apparatus of claim 13, wherein the message is one of a digital signature or document, a digital message, a secret key or an identifier.

20. The apparatus of claim 13, further comprising:
   storing in a computer readable storage medium a set of values representing a second matrix; and
   wherein (h) includes applying a logical function to the second matrix and the updated matrix.

21. The apparatus of claim 13, wherein each value in the matrix is one bit of data, one byte of data, one 16-bit word, one 32-bit word, or one 128-bit word.

22. The apparatus of claim 13, wherein the predetermined state of the stacking algorithm is completion of the stacking algorithm.

23. The apparatus of claim 13, wherein the form parameter has at least one value, and the color parameter has at least one value.

* * * * *